March 29, 1960      R. H. HOSE      2,930,834
CASING FOR INSTRUMENTS
Filed Oct. 4, 1957      2 Sheets-Sheet 1
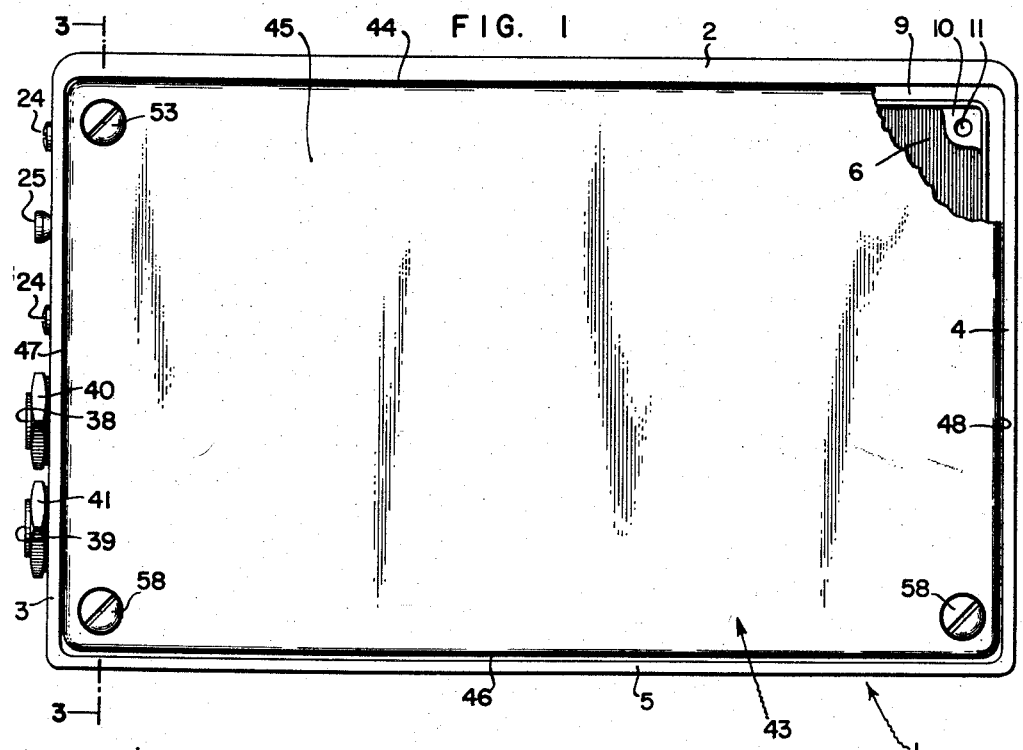
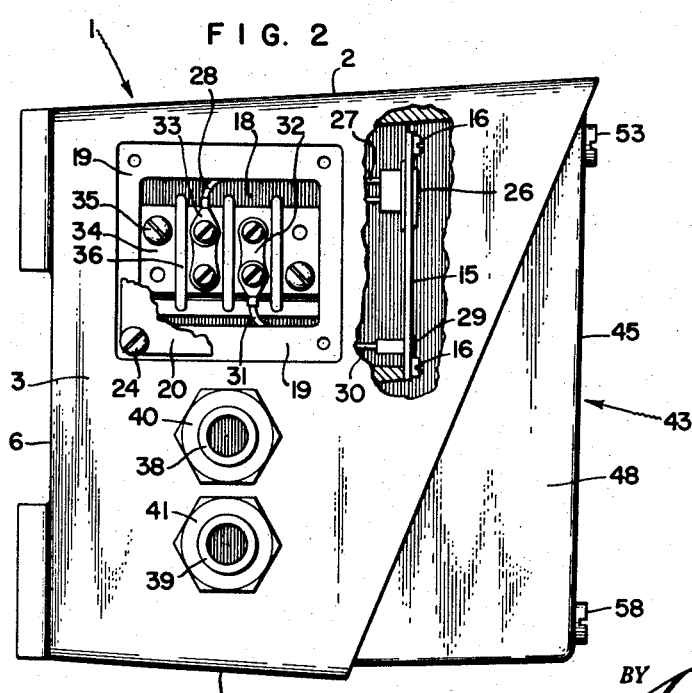
*INVENTOR.*
ROBERT H. HOSE
BY
ATTORNEY.

March 29, 1960 R. H. HOSE 2,930,834
CASING FOR INSTRUMENTS
Filed Oct. 4, 1957 2 Sheets-Sheet 2

INVENTOR.
ROBERT H. HOSE
BY
ATTORNEY.

United States Patent Office 2,930,834
Patented Mar. 29, 1960

2,930,834

CASING FOR INSTRUMENTS

Robert H. Hose, Mountainside, N.J., assignor to Minneapolis-Honeywell Regulator Company, Minneapolis, Minn., a corporation of Delaware Application October 4, 1957, Serial No. 688,267

1 Claim. (Cl. 174—52)

This invention relates to a housing for delicate instruments, such as those used for measuring, indicating, recording or controlling industrial processes. These instruments may include transducers which are devices which receive signals in one form of energy, such as electric or pneumatic signals, and put out these signals in the same or a different form of energy. This housing is adapted to protect the instrument against unauthorized persons, against inclement weather, and against moving objects, such as dropped tools or the like, which might strike the instrument.

It is an object of this invention to provide an effective housing of this character in which such instruments may be mounted in places where they are exposed to inclement weather so that the instruments are completely enclosed in the housing. The housings of this invention permit a partial inspection and service for routine replacement or attention and also permit complete inspection and attention by authorized persons both in a convenient and readily accessible manner. However, the housings may be locked or sealed against tampering by anyone except one specially authorized.

A further object of this invention is to provide a housing in which the top projects in a horizontal direction beyond the bottom and in which the top slopes so as to shed snow or rain from the interior of the housing and also protects an instrument in the interior of the housing from moving objects such as dropped tools.

Another object of this invention is to provide a housing which is simple in construction and which is readily adapted to accommodate different forms of instruments with a minimum of modification or variations of parts.

Still another object of this invention is to provide a housing which is divided by a partition into an instrument chamber in which the instrument may be accommodated and a terminal chamber in which the terminals may be accommodated so that connections to the instrument may be made by a person who is denied access to the instrument itself.

A better understanding of the present invention may be had from the following detailed description when read in connection with the accompanying drawings, in which:

Fig. 1 is front elevation of the housing with the cover broken away at one corner.

Fig. 2 is an end elevation of the case with the terminal cover and the side of the case broken away.

Figure 3:
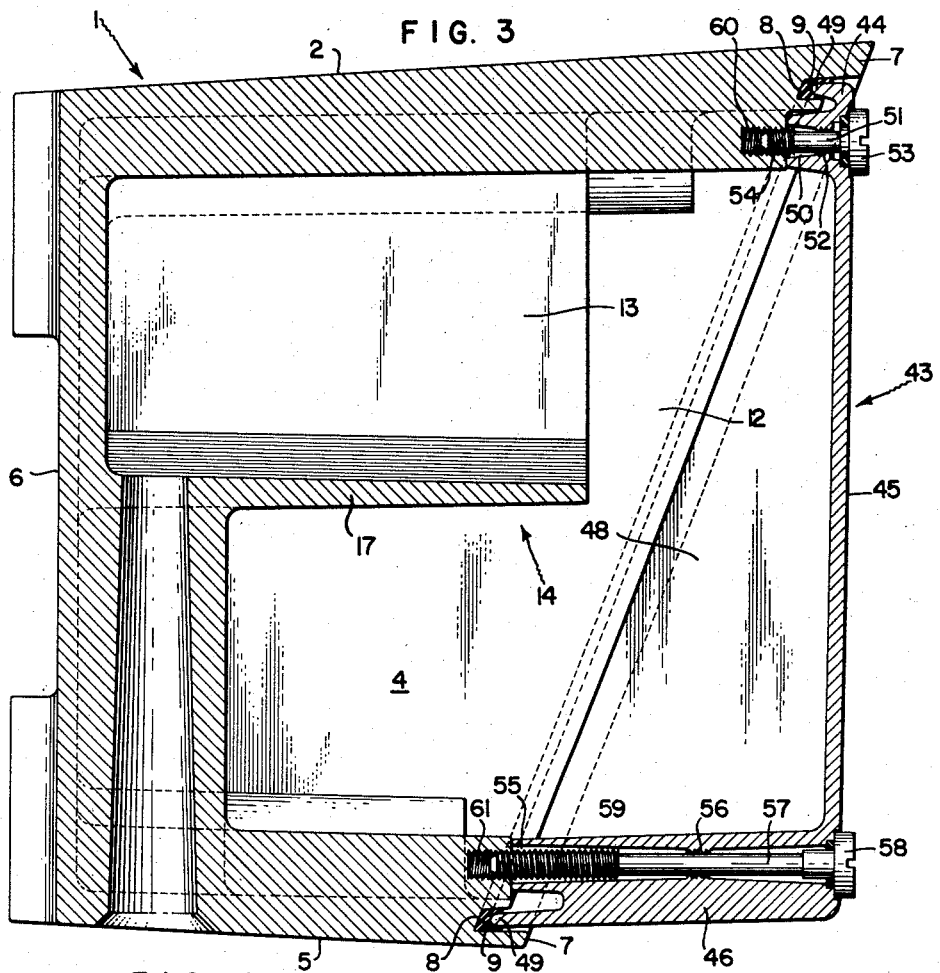
Fig. 3 is a vertical, transverse, cross section on an enlarged scale on line 3—3 of Fig. 1 as viewed in the direction of the arrows with the sheet and the terminal block omitted.

As seen in Fig. 1, the housing of this invention includes a case, generally indicated 1, and having a top 2, a left hand side wall 3, a right hand side wall 4, a bottom 5, and a back 6. Case 1 may be die cast of aluminum. Of the top 2 and the bottom 5, each is at an acute angle to the back 6. The edge which joins top 2 and back 6 is closer to the edge which joins bottom 5 and back 6 than is the front edge of the top 2 from the front edge of bottom 5. The top 2 therefore slants or slopes and is readily adapted to shed snow or rain. The top 2 likewise overhangs the open front of the housing and thereby affords partial protection against snow or rain.

Fig. 3 shows, around the open side or front of the case 1, a forwardly projecting flange 7 which surrounds a groove 8 into which a gasket 9 is inserted and held in place by cement or the like.

In the interior of case 1 at the four corners thereof are pillars 10 each having a screw threaded hole 11 in the front face thereof.

Referring to Figs. 2 and 3, the interior of case 1 is divided into an instrument chamber 12 and a terminal chamber 13 by a partition, generally indicated 14. Partition 14 is composed in part of a flat metal sheet 15 secured to case 1 by screws 16. Sheet 15 may have various indicia printed or otherwise placed thereon so that different strips can be used with different instruments while the same shape of case 1 may be used for all the different instruments. Partition 14 additionally includes wall 17 which is part of the casting of which case 1 is made.

Figure 4:
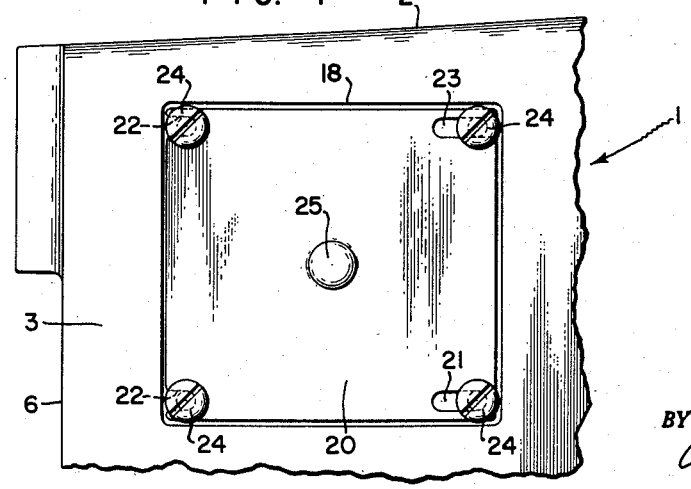
Fig. 4 is an end elevation scale of the upper left-hand corner of the case with the terminal cover in place.

In Fig. 4 it is seen that left hand side wall 3 has an opening 18 whose rim is surrounded by a gasket 19 secured in place by cement or the like. A terminal cover 20 normally closes opening 18 and has an elongated slot 21 through it closed at its ends. Terminal cover 20 also has in it two short notches 22 and a long notch 23. Screws 24 pass through this slot and these notches and secure the terminal cover 20 to the case 1. A knob 25 provides means for moving the terminal cover into and out of position.

On plate 15 are mounted sockets 26 and 29 of insulating material and having perforations in them through which extend conductors 27 and 30. Various types of sockets may be employed with different instruments. Conductors 27 and 30 are connected to wires 28 and 31.

In terminal chamber 13 is mounted terminal block 34 of insulating material which is secured to case 1 by screw 35 and which has barriers 36 on it. Terminal contacts 32 and 33 are mounted on terminal block 34 and have the ends of wires 31 and 28 secured to them, respectively. Side 3 has a pair of holes 38 and 39 passing therethrough and communicating with the instrument chamber 12. Holes 38 and 39 may have a tubular pipe 40 or 41 connected therein. Pipes 40 and 41 are adapted to be attached to other pipes.

A cover, generally indicated 43, closes the open front of case 1. Cover 43 comprises a top 44, a front 45, a bottom 46, a left hand side 47, and a right hand side 48 and may be die cast of aluminum. Fig. 5 shows that sides 47 and 48 are generally triangular in shape.

Cover 43 has on its rear a flange 49 which interfits with flange 7 on cover 1 so that the rear face of flange 49 engages the front face of gasket 9 on case 1.

Cover 43 has a pair of holes 50 passing horizontally through it. Intermediate the ends of holes 50 are screw threads 51. Through holes 50 pass screws 52 having heads 53 and screw threads 54 which mate with the screw threads 51 in holes 50 and also with the screw threads 60 in the holes 11 in the front faces of the pillars 10.

Cover 43 also has a second pair of holes 55 passing horizontally through it and having, intermediate the ends thereof, screw threads 56. Screws 57 have heads 58 and screw threaded portions 59 which cooperate with the screw threaded portions 56 and with the screw threads 61 in the holes 11 in the front face of the pillars 10.

The screws 52 and 57 are captive since they are normally held in the cover 43. When the screw threads 54 and 59 are engaged with the screw threads 11, the screws 52 and 59 secure the cover 43 to the case 1.

What is claimed is:

A weather proof housing for an instrument, including in combination, a case having five sides with the sixth side open, the top and bottom each being at an acute angle to the back, the edges of the top and of the bottom which merge with the back being closer together than the edges of the top and of the bottom at the open side of the case, the top having a greater depth in a horizontal dimension than the bottom so that the top of the open side overhangs the bottom of the open side, a partition wall within said case dividing said case into an instrument chamber and a terminal chamber, the bottom of said housing having an opening therethrough communicating with said terminal chamber, one vertical side of said case having an opening therethrough communicating with said terminal chamber, a gasket surrounding the rim of the opening in the side, a terminal cover adapted to close or to uncover the opening in said side and having at least one elongated slot through it and one notch in the edge thereof, screws passing through said slot and through said notch and securing said terminal cover to said case, said vertical side having a pair of openings through it communicating with the instrument chamber, a portion of the partition wall between said instrument chamber and said terminal chamber comprising a flat sheet of metal, a plurality of sockets of insulating material mounted on said flat sheet, electric conducting members passing through said insulating sockets, a terminal block mounted in said terminal chamber, wires connecting said electric connectors to said terminal block, a gasket surrounding the rim of said open side of said case, and a cover closing said sixth open side and comprising a front substantially parallel with the back of said case, a bottom substantially parallel with the bottom of said case and two vertical sides substantially parallel with the vertical side of said case, and captive screws mounted in said cover and securing said cover to said case.

References Cited in the file of this patent

UNITED STATES PATENTS

| | | |
|---|---|---|
| 1,677,350 | Kleckner | July 17, 1928 |
| 1,763,178 | Pierce | June 10, 1930 |
| 2,434,102 | Channel | Jan. 6, 1948 |
| 2,462,491 | Hallett | Feb. 22, 1949 |
| 2,541,236 | Giuffrida | Feb. 13, 1951 |

FOREIGN PATENTS

| | | |
|---|---|---|
| 35,359 | Denmark | Nov. 28, 1925 |
| 758,826 | Germany | Mar. 23, 1953 |